(12) United States Patent
Lichtberger

(10) Patent No.: US 10,119,227 B2
(45) Date of Patent: Nov. 6, 2018

(54) METHOD FOR MEASURING AND DISPLAYING THE TRACK GEOMETRY OF A TRACK SYSTEM

(71) Applicant: HP3 Real GmbH, Vienna (AT)

(72) Inventor: Bernhard Lichtberger, Pregarten (AT)

(73) Assignee: HP3 Real GmbH, Vienna (AT)

( * ) Notice: Subject to any disclaimer, the term of this patent is extended or adjusted under 35 U.S.C. 154(b) by 0 days.

(21) Appl. No.: 15/513,152

(22) PCT Filed: Oct. 19, 2015

(86) PCT No.: PCT/AT2015/050261
§ 371 (c)(1),
(2) Date: Mar. 21, 2017

(87) PCT Pub. No.: WO2016/061602
PCT Pub. Date: Apr. 28, 2016

(65) Prior Publication Data
US 2017/0306568 A1    Oct. 26, 2017

(30) Foreign Application Priority Data

Oct. 22, 2014  (AT) .............................. A 50758/2014

(51) Int. Cl.
*G06T 7/00* (2017.01)
*E01B 35/06* (2006.01)
(Continued)

(52) U.S. Cl.
CPC ............... *E01B 35/06* (2013.01); *B61K 9/08* (2013.01); *B61L 23/047* (2013.01);
(Continued)

(58) Field of Classification Search
None
See application file for complete search history.

(56) References Cited

U.S. PATENT DOCUMENTS

| 4,497,255 A | 2/1985 | Theurer |
| 2006/0032063 A1 | 2/2006 | Tomasello et al. |

(Continued)

FOREIGN PATENT DOCUMENTS

DE    32 37 724 A1    6/1983

*Primary Examiner* — Delomia L Gilliard
(74) *Attorney, Agent, or Firm* — Tiajoloff & Kelly LLP

(57) ABSTRACT

A method for measuring and displaying the track geometry of a track system uses a track-driveable permanent-way machine, comprising a control measurement system measuring the track position to be corrected before a lifting and lining device, an acceptance measurement system measuring the corrected track position after it, and output units displaying the measured values. The lifting and lining device is controlled depending on the measured values of the control measurement system and the acceptance measurement system to achieve a specified target track geometry. A three-dimensional position image is calculated from the curvature image ($k_{(s)}$), longitudinal level image ($h_{(s)}$) and superelevation image ($u_{(s)}$) of the target track geometry, put into a perspective display, and displayed by the output unit, supplemented by measured error curves for track parameters of track direction, superelevation, twist, and longitudinal level.

11 Claims, 4 Drawing Sheets

(51) Int. Cl.

| | |
|---|---|
| *B61K 9/08* | (2006.01) |
| *B61L 23/04* | (2006.01) |
| *E01B 33/06* | (2006.01) |
| *E01B 33/02* | (2006.01) |
| *G01C 7/04* | (2006.01) |
| *G06T 15/20* | (2011.01) |
| *G06T 7/73* | (2017.01) |

(52) U.S. Cl.
CPC ............ *B61L 23/048* (2013.01); *E01B 33/02* (2013.01); *E01B 33/06* (2013.01); *G01C 7/04* (2013.01); *G06T 15/205* (2013.01); *E01B 2203/012* (2013.01); *E01B 2203/10* (2013.01); *E01B 2203/16* (2013.01); *G06T 7/74* (2017.01)

(56) References Cited

U.S. PATENT DOCUMENTS

2010/0100268 A1\* 4/2010 Zhang .................. B60W 30/09
701/25
2012/0300060 A1 11/2012 Farritor
2015/0368865 A1\* 12/2015 Lichtberger ............ E01B 27/17
104/7.2

\* cited by examiner

METHOD FOR MEASURING AND DISPLAYING THE TRACK GEOMETRY OF A TRACK SYSTEM

FIELD OF THE INVENTION

The invention relates to a method for measuring and displaying the track geometry of a track system by means of a track-driveable permanent-way machine having a control measurement system for measuring the track position to be corrected before a lifting and lining device, an acceptance measurement system for measuring the corrected track position after the lifting and lining device, and associated output units for displaying the measured values, wherein the lifting and lining device is controlled depending on the measured values of the control measurement system and the acceptance measurement system for the purpose of achieving a specified target track geometry, which is predetermined especially in form of a curvature image, longitudinal level image and superelevation image.

DESCRIPTION OF THE PRIOR ART

Most tracks for railways are arranged as ballasted tracks. The sleepers lie in the ballast. The ballast is provided for dissipating the wheel forces into the subgrade, the absorption of transverse forces acting on the rail and the sleepers, and the drainage of the surface water. Irregular subsidence in the ballast and displacements in the lateral positional geometry of the track are caused by the acting wheel forces of the trains that travel over said ballast. The subsidence in the ballast bed causes errors in the longitudinal level, the superelevation (in the curve), the twist and the track lining position.

If specific comfort limit values or safety limit values of these geometric parameters as determined by railway authorities are exceeded, maintenance work is planned and performed in a timely fashion. If previously determined danger limit values are exceeded, the speed is reduced depending on the magnitude of the errors, or the track is blocked and the repair of the so-called individual errors is carried out immediately. The repair and correction of these geometric track errors is mostly currently carried out by means of track construction machines. There are measurement systems for detecting the current track position for the parameters of lining, lifting, twisting and transverse inclination for the purpose of controlling the process.

In order to ensure that the track can be released for operation again after such track geometry repair work, the permanent-way railway machines are equipped with so-called acceptance measurement systems and acceptance recording systems. So-called acceptance tolerances have been determined by the railway authorities for the quality of the track position after the improvement by the permanent-way machines or other methods. They represent the minimum requirements placed on the quality of the implemented geometric improvements. They are proven by acceptance measurement systems and acceptance recording systems. The recorded results represent official safety-relevant documents. That is why such acceptance measurement systems and acceptance recording systems are subjected to regular calibration and acceptance by authorised parties. The parameters to be disclosed, corrected and recorded are the twisting of the track, longitudinal level of the track, direction or lateral position of the track, the track gauge, and the transverse inclination or superelevation of the track.

The target geometries of the railway tracks are available in form of track plans and can be used after input into the control computer for calculating the systematic errors with knowledge of the behaviour of the measurement systems. On track construction machines, there is the front section operator who is responsible for controlling the machine concerning the target geometry and also concerning the acceptance by the data recorder. In the event of an error that is displayed by the acceptance recorder, the machine must travel back for example and repair the error so that the acceptance tolerances are maintained.

The front section operator of track construction machines sees the track geometry according to the currently used methods in form of curvature progressions of the track over the arc length. The illustration occurs visually on a computer screen in form of diagrams. The machine operator is shown diagrams on a separate additional screen which represent the deviations of the individual parameters from the target position. According to the currently used methods, the machine operator can enter additional corrective values depending on these deviations. If the track springs back, the machine operator can allow the track to be slightly overpressed by the machines. The effects of the corrective value are only visible with delays because the acceptance recorder records the track position only approximately 10 m after the location where the track position is processed.

The illustration as a curvature image, longitudinal inclination image and superelevation image is abstract and not generally understandable to the machine operator. The view from the front window of the machine which shows a track position in reality is not congruent with the illustrated, mathematically abstract computer image on the screen. This current method therefore places complex demands on the machine operator; the information provided is unclear, difficult to understand and can therefore easily lead to operating errors. This is not only aggravated by two independent computers for the guidance after the track target position and the digital acceptance recorder, but also by the fact that the display axes of the measurement recorders are usually shown in a precisely reverse manner.

The recording of geometric track positions currently occurs as a standard mostly with asymmetric cord measurement systems (cord sections a, b). A steel cord is centrally tensioned in this process between a front and a rear measuring carriage which is pressed onto the track on one side. A measuring carriage is arranged and pressed on one side between these tensioning carriages. The measuring carriage carries a scanning apparatus which measures of the position of the steel cord from the centre position. This value is known as arrow height. The carriages are pressed to the outside of the bend for the direction. The inner curved rail is used as a reference for the height. The target curvature image is converted by means of the following arrow height formula into a target arrow height image (proportional to the curvature image).

$$f = \frac{a \cdot b}{2R}$$

The progression of the thus calculated target arrow height is compared with the measured actual arrow height during the measurement and the differences are recorded. Acceptance limit values are specified for these differences by the railway administration authorities. This procedure is also used similarly for the longitudinal inclination curvature image. The superelevation can be stated directly as a reference via the centroid axis and can be measured via a pendulum or other inclinometers, and the deviations can be stated by comparison with the target superelevations. Acceptance limit values also apply to the superelevation deviations. Arrow height measurements are subjected to a so-called transfer function, i.e. the amplification and phase position of the measured errors are dependent on wavelength and correspond only qualitatively to the actual track geometry errors.

SUMMARY OF THE INVENTION

The invention is thus based on the object of providing a method of the kind mentioned above with which the target track geometry, the actual track geometry and the deviations from the target track geometry caused by imprecision in the work are to be illustrated in such a clear fashion that the probabilities for operating errors of the machine are reduced and intuitive control of the machine is enabled.

This object is achieved in accordance with the invention in such a way that first a three-dimensional position image is calculated from the curvature image, the longitudinal level image and the superelevation image of the target track geometry, that the three-dimensional position image is put into a perspective display and is displayed by means of the output unit, and that the perspective position image is supplemented by the measured error curves for the track parameters of track direction, superelevation, twist, and longitudinal level.

The target track geometry, the actual track geometry and the deviations from the target track geometry produced by imprecision in the work are shown in perspective in an image, in addition to the effects of corrective action by the machine operator, which image is substantially congruent with the view from his window in the working direction. In addition, certain track markers (synchronisation points) such as switch positions, bridge positions or main points of the curvature (positions in the track in which the direction curvature image, the longitudinal inclination image or the superelevation image change) can be entered in this perspective image. Synchronisation points are associated for this purpose with the target track geometry, which synchronisation points are illustrated at the respective positions of the respective illustration of the track progression, wherein a synchronisation of the actual synchronisation points on the track system is made with the virtual synchronisation points of the perspective display upon reaching the synchronisation points with the permanent-way machine.

The position of the permanent-way machine in the display of the output unit and the display of the current error values occurs continuously with the progression of the machine. The view of the machine operator from his window in the working direction is thus always substantially congruent with the perspective illustration. The progression of the residual errors is pre-calculated depending on the measured error curves and the performed control interventions are also displayed in the perspective illustration.

Furthermore, the track position in front of the permanent-way machine can be recorded with an image recording device, the position of the rails can be calculated with an image evaluation unit, and the calculator position of the rails and the target track geometry can be displayed in perspective in the position image. The machine operator can thus consider in advance any required corrective actions that need to be made by the operator. It is recommended for this purpose that the progression of the deviations of the track position to be corrected is calculated from the target position and trends are calculated and are displayed on the output unit in order to ensure adherence to the tolerances by timely intervention on the lifting and lining device.

Corrections of calculated deviations of the track position to be corrected from the target position in front of the lifting and lining device can be carried out in an automated manner by a control system of the lifting and lining device.

Since the permanent-way machines mostly measure the arc length via odometers and they are provided with slightly imprecise values as a result of slippage, soiling of the wheel etc, the machine is synchronised at the synchronisation points with the target arc length. For this purpose, synchronisation points in front of the permanent-way machine can be recorded with an image recording device and can be displayed in the perspective image from a preselected approach for synchronisation. The synchronisation prevents the adding up of the measurement errors of the arc length. The synchronisation can be carried out manually or automatically.

In accordance with the invention, the target track geometry which is predetermined by the curvature images for the lateral position, the longitudinal inclination images for the height position and the superelevation images for the track superelevation is converted into a three-dimensional space curve and the target track geometry is subsequently displayed visually in perspective, on a screen or the like. The detected deviations of the generated track position from the target position are entered in the perspective image and used for correction via the control unit, either in an automatic mode or manual mode. Synchronisation points of the track which are used for synchronisation of the measured arc length of the track construction machine with the actual arc length are also shown in perspective with respect to their position, similar to other important track points such as switches, bridges, level crossings etc.

Automatic correction of the residual track geometry errors can occur for example by calculating the mean values of the recorded errors of the longitudinal level, the direction and superelevation (e.g. over the last 10 m), in that the average value of the respective errors is returned to the control unit of the permanent-way machine for correction (feedback loop). If the mean value of the superelevation error is at −2 mm for example, the superelevated side is lifted higher by 2 mm by the permanent-way machine in order to compensate this error. The same also applies to the other measurement parameters.

The perspective image can be projected via a head-up projector onto the front window screen of the permanent-way machine and/or displayed with data goggles. Furthermore, the perspective image can be transmitted by a radio data line to a control centre remote from the operations site of the permanent-way machine for the purpose of monitoring the progress of the work, wherein the work can optionally be carried out in a remote-controlled manner from the control centre.

BRIEF DESCRIPTION OF THE DRAWINGS

The subject matter of the invention is shown in the drawings by way of example, wherein.

DESCRIPTION OF THE PREFERRED EMBODIMENT

Figure 1:
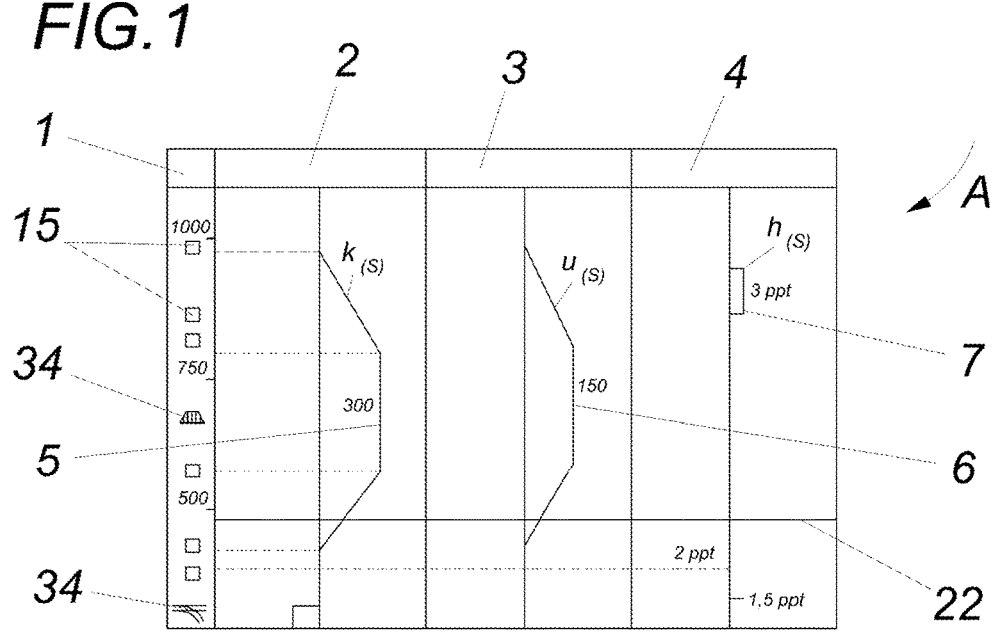
FIG. 1 shows a monitor display of a target curvature image, a superelevation image and a longitudinal inclination image as well as the synchronisation points according to the prior art.

FIG. 1 shows a schematic monitor display A of a track geometry computer according to the prior art by way of example. The first column 1 shows the stationing in kilometers of the arc length. The next column 2 shows the progression of the so-called curvature image k(s). The curvature 5 corresponds to the reciprocal value of the track radius $1/R_i$. In order to ensure that no excessive jerk is produced when a train travels from straight tracks into a track curve, so-called transition curves are implemented. The simplest form of the transition curve is the linear transition curve, in which the curvature increases continuously with the arc length until it has reached the curvature which corresponds to the track radius. The following applies to the progression of the curvature of the linear transition curve:

$$k = \frac{s}{L} \cdot \frac{1}{R}$$
$$für\ k = 0$$
$$bis\ k = \frac{1}{R}$$

In the layout plan, the linear transition curve represents a clothoid. In addition to this transition curve, there are also other embodiments such as the so-called Bloss transition curve, with a progression of the curvature according to the equation:

$$k = 3 \cdot \left(\frac{s}{L}\right)^2 - 2 \cdot \left(\frac{s}{L}\right)^3$$

Cosine-shaped or sinusoidal as well as biquadratic (Helmert) transition curves and other shapes are known. It is a general property thereof that analytical methods cannot be applied for determining Cartesian coordinates for the layout plan, but approximation methods or numerical methods must be used instead. The display of the curvature over the arc length k(s) requires double integration for the representation in a Cartesian coordinate system.

The next column 3 shows the progression of the superelevation 6 u(s). The superelevation is usually stated in millimeters. It is the dimension by which the outer curved rail is laid in a lifted manner in relation to the inner track curve as a reference.

The last column 4 shows the longitudinal inclination image h(s) 7, which is also indicated as a curvature image. Since the inclinations in railways are relatively small, no transition curves are necessary for the longitudinal level. Mostly, only very low vertical curves of the transition occur from one inclination to another, or none at all. Column 1 also displays synchronisation points on the main curve points 15 or for special points such as for bridges 34 or switches 34 in form of symbols. The position of the machine 22 is illustrated in the geometry during the work as a horizontal line.

Figure 2:
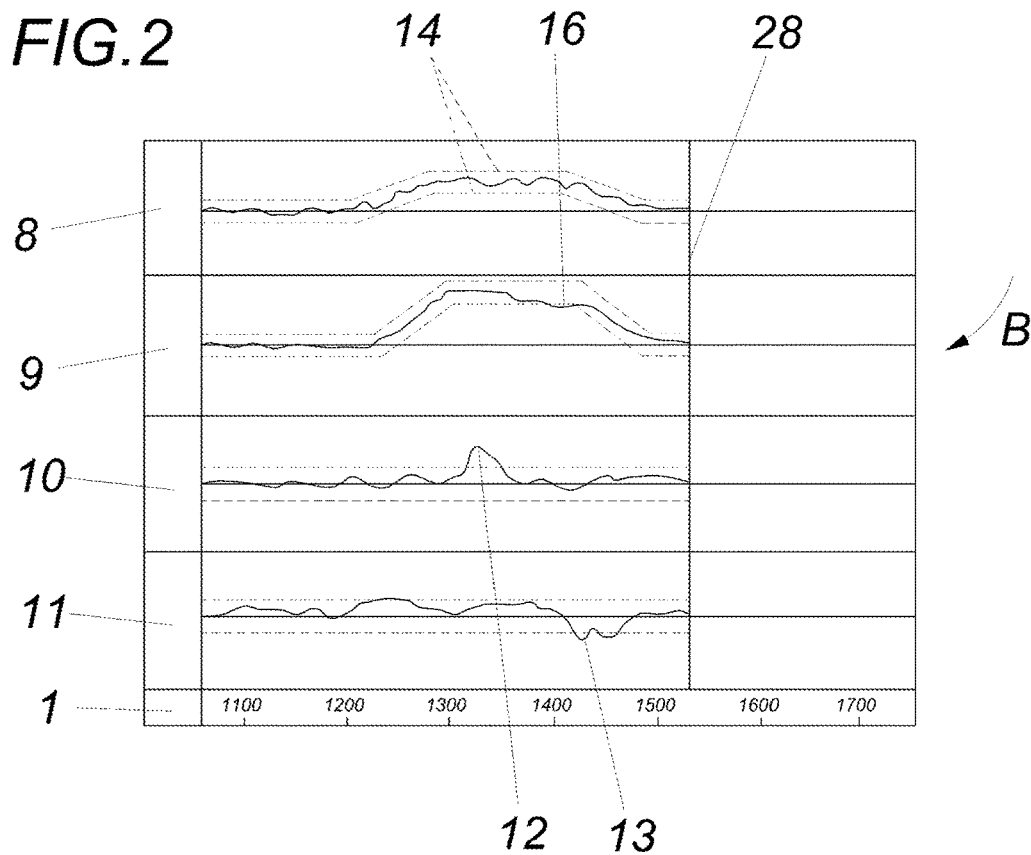
FIG. 2 shows an illustration of a screen image of a measurement recording after completed maintenance work according to the prior art.

FIG. 2 schematically shows the monitor screen B of a digital recorder of the geometric track position according to the prior art after the track-position correction work. The lowermost line 1 shows the stationing in kilometers (arc length). The uppermost line 8 shows the progression of the measured arrow height (direction) and the permissible tolerances 14 around said measured value. If these tolerances are exceeded, the machine operator is warned via a signal. The second line 9 from above represents the progression of the measured superelevation and the tolerance lines. There is an overshoot in the downward direction in 16. In this case, the machine must retract and correct this region again until the tolerances match. The third line from above 10 shows the progression of the longitudinal level of the tolerance lines. An overshoot is present in 12 in this case too. Finally, a quantity derived from the superelevation, i.e. the twist, is represented in the fourth column from above 11. The twist is a quantity which due to its relevance for safety against derailment is especially safety-critical. The illustrated overshoot in 13 requires reprocessing by the tamping machine. The position of the perpendicular line 28 represents the position of the current measurement recording.

Figure 3:
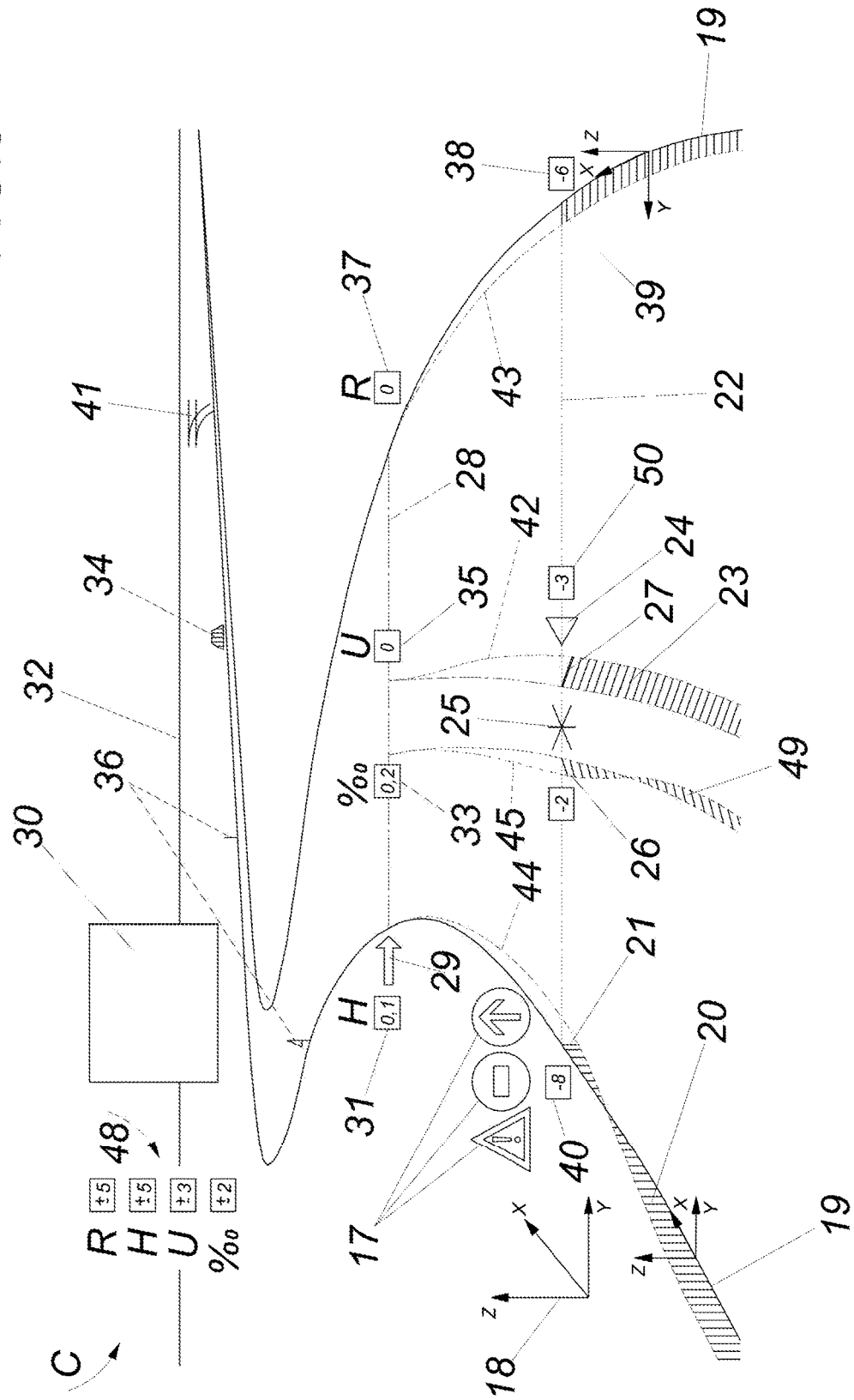
FIG. 3 shows a perspective view in accordance with the invention of the track geometry, the remaining track errors and the synchronisation points.

FIG. 3 shows the perspective image of machine guidance in accordance with the invention. The aforementioned two monitor images for the track position computer A and the acceptance recorder B in curvature images over the arc length are integrated in an image in form of a perspective illustration. A three-dimensional position image is calculated from the target track geometry default values, the curvature image $k_{(s)}$, 2, longitudinal level image $h_{(s)}$, 4, and superelevation image $u_{(s)}$, 3 of the target track geometry. The three-dimensional position image 19 is brought to a perspective view and is displayed with the output unit. Furthermore, the perspective position image is supplemented by the measured error curves for the track parameters of track direction 39, superelevation 23, twist 49 and longitudinal level 20. A spatial target curve is calculated in Cartesian coordinates and it is converted into a perspective view and presented. 19 shows the calculated track of the target position of the track. 29 symbolically displays the working position of the machine. 28 shows the current position of the permanent-way machine. 22 shows the position of the recording of the recorder. 20 shows the deviation of the longitudinal level from the target track height position. 21 shows the current last deviation. The value of this deviation is indicated in field 40. 31 shows the predicted value which would be obtained by the correction. Line 44 shows the previously calculated progression in the event of manual action of the machine operator via the compensation potentiometer. In the automatic mode, the computer would calculate and carry out the necessary correction itself. 48 shows the permitted limit values for the measured acceptance parameter. R stands for the deviation of the track lining position in mm, H for the deviations of the height position in mm, u for the deviation of the superelevation in mm, and % o for the permissible limit value of the twist in per mil. The line 39 indicates the horizontal track position deviations relating to the target curve of the track. The deviation present at the current measurement point is output in 38 in numerical values. 43 indicates the progression of the previously calculated curve in a manual or automatic correction. The previously calculated value of the deviation is indicated in 37. 23 represents the deviation of the superelevation. The angle of the hatched area indicates whether it is an upward or downward superelevation error. The adjoining 50 represents the current deviation in numerical values. 24 represents the superelevation as a symbol. Since it concerns a left curve, the right rail is superelevated. The deviation of the track lining position is always shown in the rail that is on the outside in the curve and the longitudinal level on the rail that is on the inside of the curve because it is the reference rail for the height. 42 is the predicted curve of the development of the superelevation error at respective manual or automatic correction. 35 is the value which would presumably be obtained during the subsequent measurement. 27 is the current deviation of the superelevation at the measuring point. 49 represents the deviation curve of the twist. 25 is the symbol for the twist. 26 is the current deviation at the measuring point. 45 is the previously calculated curve of the manual or automatic corrective action. 33 is the value which would be obtained with the current corrective values at the working point. One of the signs 17 appears upon exceeding one of the limit values of the acceptance curves or if the progression of the acceptance curves is satisfactory. The symbol to the right would indicate a flawless progression, the middle one would represent an impermissible exceeding of the tolerances, while the one on the left would indicate that the trend of the deviation indicates an imminent exceeding of the limit values. 36 indicates the synchronisation points of the main curve points. Other potential synchronisation points such as a bridge 34 or a switch 41 are illustrated in an "expressive" manner. 32 shows the horizon. If the machine, apart from a preset threshold value, approaches a synchronisation point (e.g. 5 m), a visual and/or acoustic warning is made and the image of the synchronisation point video camera is displayed in 30. The synchronisation occurs by the machine operator by means of the video image or by inspection from the window manually via a push button. The synchronisation points are usually marked on the rail. If the front tension carriage is precisely above the synchronisation point, synchronisation is carried out. From a perspective view, the image C is shown from a slight bird's eye perspective, with a vanishing point in infinity common to both rails. The progression of the rails is only calculated and displayed up to a finite length (e.g. 50 m).

Figure 4:
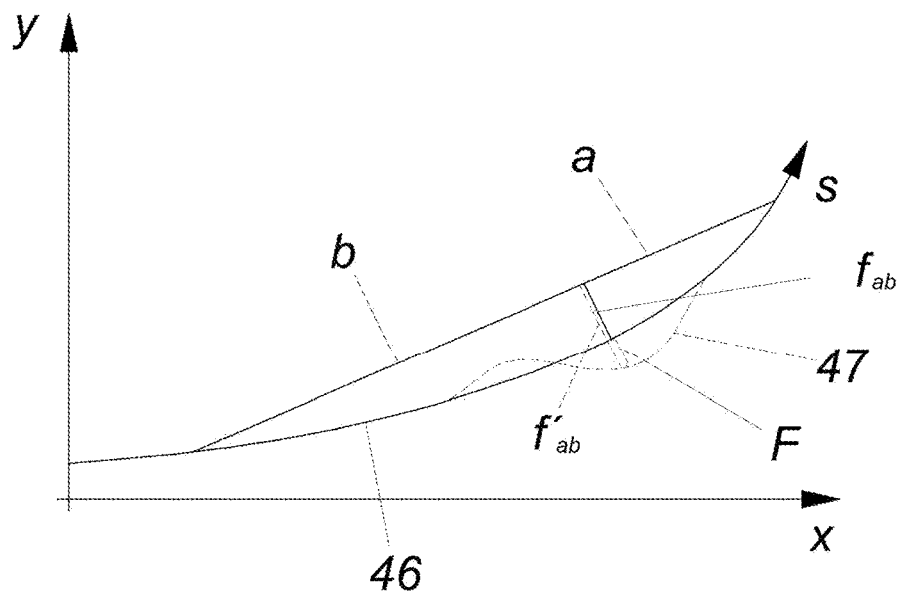
FIG. 4 shows a landscape view of a track position in a layout plan with asymmetric cord measurement.

FIG. 4 shows an arc 46 in a layout plan. So-called arrow height measurement methods are commonly used in permanent-way machines for measuring the track position. A cord (a, b) of length l=a+b is guided on the rail via measuring carriages along the arc (arc length s). 47 shows a track error. The calculated target arrow height $f_{ab}$ is compared by the machine with the measured arrow height $f'_{ab}$. This leads to the deviation F which is compensated by the machine by respective lining. Asymmetric cords with section lengths a and b are usually used. The arrow height is then obtained from $$f = \frac{a \cdot b}{2R}$$

Figure 5:
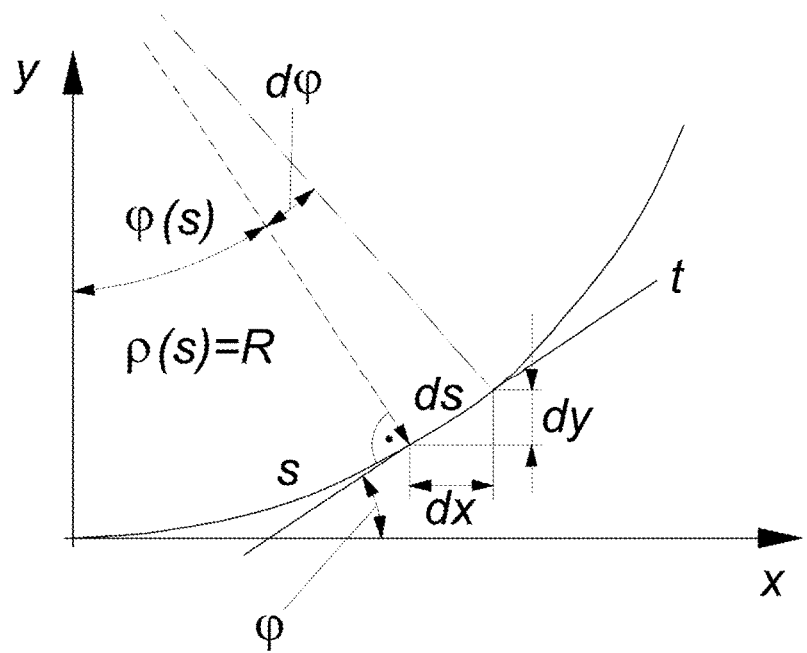
FIG. 5 shows an illustration of a track system in a layout plan with indication of the curvature radius, track curve angle and the adjoining tangent.

FIG. 5 schematically shows an arc 46 in the plan view (x, y coordinates) and the correlation between arc angle φ and radian measure s. The following mathematical correlations apply to the calculation of the coordinative illustration:

$$\varphi(s) = \int \frac{1}{\rho(s)} ds = \int k(s) ds$$

$$dx = \cos\varphi(s) ds$$

$$dy = \sin\varphi(s) ds$$

$$x = \int_{s1}^{s2} \cos\varphi(s) ds = \int_{s1}^{s2} \cos\left\{\int_{s1}^{s2} k(s) ds\right\} ds$$

$$y = \int_{s1}^{s2} \sin\varphi(s) ds = \int_{s1}^{s2} \sin\left\{\int_{s1}^{s2} k(s) ds\right\} ds$$

Since the integrals are usually not analytically solvable, they are calculated numerically. k(s) represents the curvature progression in the layout plan. Procedure is carried out analogously for the height position; the height progression is mapped onto the y, z plane. The superelevation can be calculated directly (because stated as u(s)) and can be added to the Z axis of the reference rail (which is always the rail on the outside of the curve). The rails have the distance d (d=track gauge, normal gauge=1435 mm).

Figure 6:
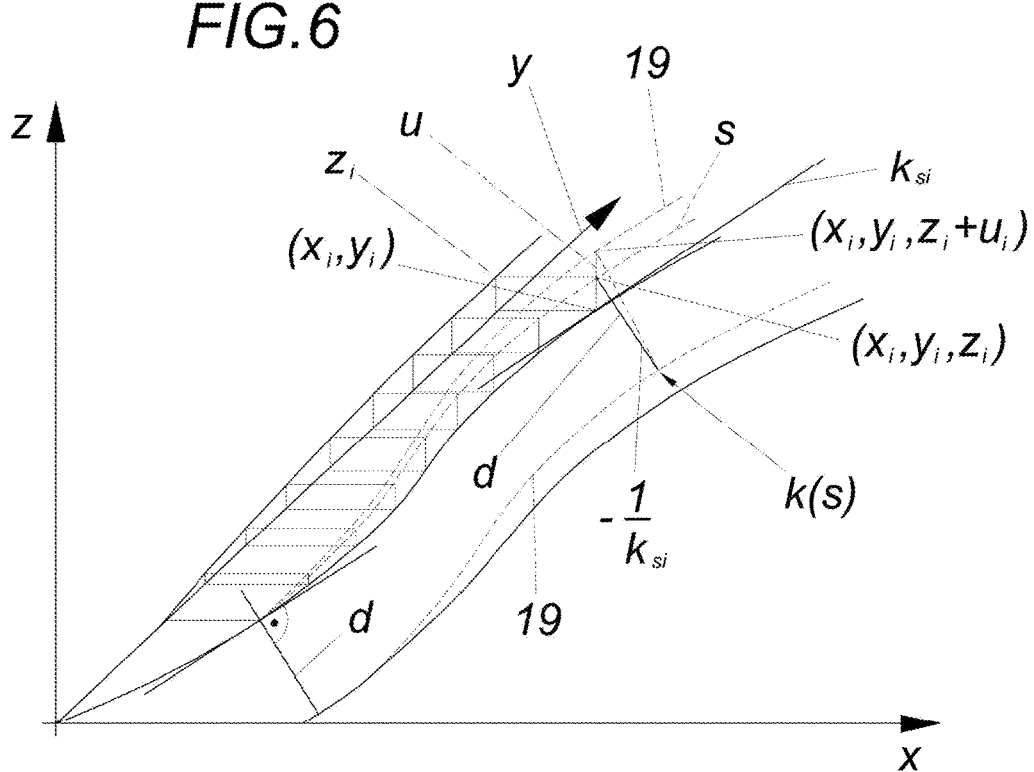
FIG. 6 shows an illustration of the composition of the three-dimensional display coordinates consisting of the layout plan, height position and superelevation.

FIG. 6 shows how the three-dimensional progression of the rails can be calculated from the layout plan (in the x, y plane), the vertical plan view (y, z plane), the superelevation u and the track gauge d.

Figure 7:
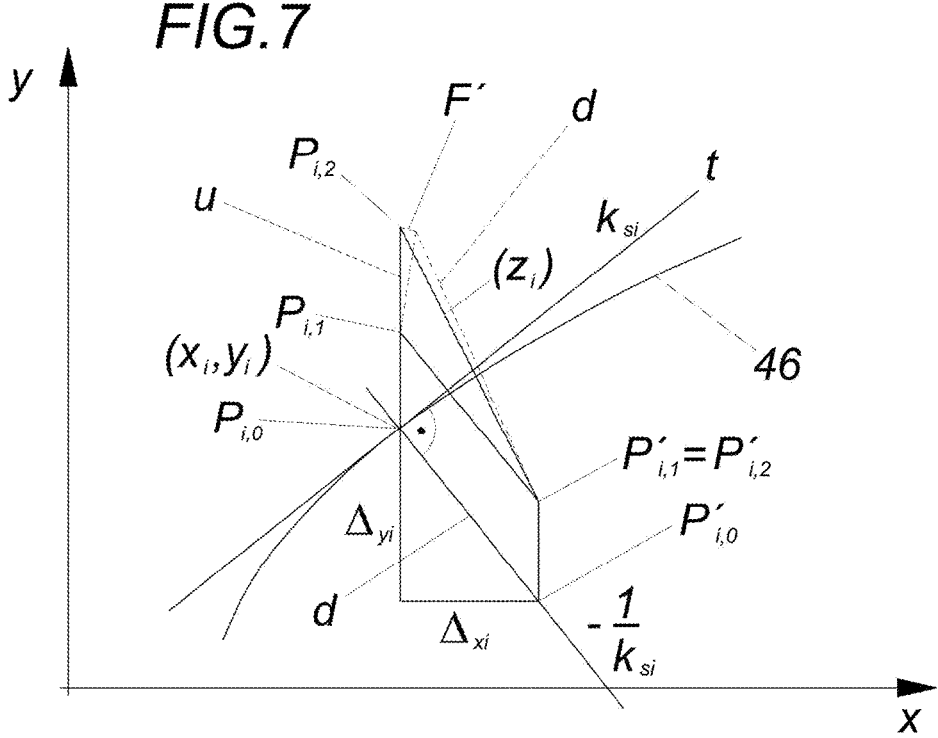
FIG. 7 shows a detailed view of the composition of the three-dimensional display coordinates consisting of the layout plan, height position and superelevation.

FIG. 7 represents the assembly in detail. A calculated point ($P_{i,0}$) with the coordinates ($x_i$, $y_i$) in the x, y plane is supplemented by the z coordinate from the vertical plan view to form the three-dimensional point $P_{i,1}$ with the coordinates ($x_i$, $y_i$, $z_i$). Since it concerns a right-hand arc, the superelevation u must be entered on the left rail. The point $P_{i,2}$ with the coordinates ($x_i$, $y_i$, $z_i+u_i$) is obtained. The track gauge d is deducted perpendicularly ($-1/k_{si}$) on the tangent t (ascending gradient $k_{si}$) in the layout plan. This leads to the point $P'_{i,0}$ with the coordinates ($x'_i$, $y'_i$). In order to obtain the three-dimensional point $P'_{i,1}$, the z coordinate is supplemented to form the coordinates ($x'_i$, $y'_i$, $z'_i$). In the event of precise calculation, the superelevation (on the outside curve) is not perpendicular to the x, y plane but slightly oblique (maximum approx. 6°). This deviation F' is irrelevant for the perspective illustration and is therefore disregarded.

The invention claimed is:
1. A method for measuring and displaying the track geometry of a track system using a track-driveable permanent-way machine having a control measurement system measuring a value of the track position to be corrected before a lifting and lining device, an acceptance measurement system measuring a value of the corrected track position after the lifting and lining device, and an associated output unit having a display that is visible to a user displaying the measured values, said method comprising:
controlling the lifting and lining device depending on the measured values of the control measurement system and the acceptance measurement system so as to achieve a predetermined target track geometry including a curvature image, a longitudinal level image and a superelevation image;
first calculating a three-dimensional position image from the curvature image, longitudinal level image and superelevation image of the target track geometry, putting the three-dimensional position image into a perspective display so as to form a perspective position image, and displaying the perspective position image using the output unit, and supplementing the perspective position image by measured error curves for track parameters including track direction, superelevation, twist, and longitudinal level.

2. A method according to claim 1, and further comprising assigning synchronization points to the target track geometry, and displaying said synchronization points at respective positions of the perspective display of the track progression, wherein once the permanent-way machine reaches the synchronization points a synchronization of actual synchronization points on the track system is carried out with virtual synchronization points of the perspective display.

3. A method according to claim 1, wherein the track position of the permanent-way machine and current error values are displayed continuously in the display of the output unit with continued travel of the machine.

4. A method according to claim 1, wherein a progression of residual errors is precalculated based on the measured error curves and performed control interventions and is displayed on a display of the output unit.

5. A method according to claim 1, wherein the track position before the permanent-way machine is recorded with an image recording device, a position of the rails is calculated with image evaluation, and the calculated position of the rails and the target track geometry are displayed in perspective in the perspective position image.

6. A method according to claim 1, and further comprising recording synchronization points before the permanent-way machine with an image recording device and inserting said synchronization points into the perspective image from a preselectable approach for synchronization.

7. A method according to claim 1, wherein a progression of deviations of the track position from the target position to be corrected is calculated, that trends are calculated and are displayed on the output unit so as to ensure the adherence to tolerances by taking timely action on the lifting and lining devices.

8. A method according to claim 1, wherein corrections of calculated deviations of the track position to be corrected from the target position before the lifting and lining device are carried out by a control system of the lifting and lining device.

9. A method according to claim 1, wherein the perspective position image is projected via a head-up projector onto a front windscreen of the permanent-way machine or displayed using data goggles.

10. A method according to claim 1, wherein the perspective position image is transmitted via a radio data line to a control center spatially remote from an operating location of the permanent-way machine that monitors progress of the method.

11. A method according to claim 10, wherein the control center remotely controls the method.

* * * * *